United States Patent [19]

Pulek et al.

[11] Patent Number: 5,399,264
[45] Date of Patent: Mar. 21, 1995

[54] COMPRESSIBLE DIFFERENTIAL PRESSURE ENERGIZED SEALS FOR FILTER ELEMENTS AND THE LIKE

[75] Inventors: John L. Pulek, New Haven; Robert G. Barnes, Meriden; Eugene A. Ostreicher, Farmington, all of Conn.

[73] Assignee: Cuno, Incorporated, Meriden, Conn.

[21] Appl. No.: 34,730

[22] Filed: Mar. 22, 1993

[51] Int. Cl.$^6$ .............................................. B01D 27/08
[52] U.S. Cl. ................................ 210/450; 210/493.2; 55/502; 55/510; 277/178; 277/205
[58] Field of Search ............... 210/450, 493.2; 55/502, 55/510; 277/168, 169, 170, 178, 205

[56] References Cited

U.S. PATENT DOCUMENTS

| | | | |
|---|---|---|---|
| 2,539,767 | 1/1951 | Anderson | 92/57 |
| 2,539,768 | 1/1951 | Anderson | 210/204 |
| 2,642,187 | 6/1953 | Bell | 210/169 |
| 2,726,184 | 12/1955 | Cox et al. | 154/83 |
| 2,739,916 | 3/1956 | Parker | 154/81 |
| 2,771,156 | 11/1956 | Kasten et al. | 183/71 |
| 3,002,870 | 10/1961 | Belgarde et al. | 156/70 |
| 3,164,506 | 1/1965 | Lake | 156/69 |
| 3,397,518 | 8/1968 | Rogers | 55/497 |
| 3,585,107 | 6/1971 | Williams | 162/387 |
| 3,594,273 | 7/1971 | Williams | 162/219 |
| 3,619,353 | 11/1971 | Williams | 162/129 |
| 3,720,323 | 3/1973 | Landree | 210/493 |
| 3,884,662 | 5/1975 | Hladik | 55/484 |
| 3,989,491 | 11/1976 | Pelosi, Jr. et al. | 55/502 |
| 3,995,076 | 11/1976 | Sicard | 427/295 |
| 4,038,194 | 7/1977 | Luceyk et al. | 210/436 |
| 4,100,009 | 7/1978 | Nakajima et al. | 156/184 |
| 4,159,197 | 6/1979 | Schuler et al. | 55/379 |
| 4,391,384 | 7/1983 | Moore et al. | 220/359 |
| 4,464,263 | 8/1984 | Brownell | 210/484 |
| 4,832,844 | 5/1989 | Ayers | 277/168 |
| 5,015,316 | 5/1991 | Ostreicher et al. | 156/69 |
| 5,028,327 | 7/1991 | Ostreicher | 210/450 |
| 5,075,004 | 12/1991 | Gershenson et al. | 210/445 |
| 5,131,667 | 7/1992 | Mong et al. | 277/169 |
| 5,238,717 | 8/1993 | Boylan | 210/493.2 |
| 5,250,179 | 10/1993 | Spearman | 210/493.2 |
| 5,290,442 | 3/1994 | Clack | 210/257.1 |

FOREIGN PATENT DOCUMENTS

| | | |
|---|---|---|
| 2266535 | 10/1975 | France . |
| 2429474 | 11/1975 | Germany . |
| 2620148 | 12/1976 | Germany . |
| 3208438 | 9/1983 | Germany . |
| 55-159822 | 12/1980 | Japan . |
| 56-10084 | 3/1981 | Japan . |
| 59-85472 | 5/1984 | Japan . |
| 689575 | 4/1953 | United Kingdom . |
| 1334002 | 10/1973 | United Kingdom . |
| 2048109 | 12/1980 | United Kingdom . |
| 2134811A | 8/1984 | United Kingdom . |
| 2140317A | 11/1984 | United Kingdom . |

Primary Examiner—Robert A. Dawson
Assistant Examiner—W. L. Walker
Attorney, Agent, or Firm—Renner, Kenner, Greive, Bobak, Taylor & Weber

[57] ABSTRACT

A compressible differential pressure energized seal (18) coacting between a filter element (10) and the like and a housing (21) comprises a compressible portion (35) having a large open end (36) and a small open end (37), the large end (36) directed toward and contacting the housing (21) and the small end (37) directed toward the filter (10) element; and an annular flange (38) integrally attached to the compressible portion (35) at its small end (37) and extending outwardly, the flange (38) operatively communicating with the filter element (10). The seal (18) may also include at least one flap (43) to center the filter element (10) to which it is attached onto a centering rod (31) carried within the housing (21). Such a seal (18) is compressed when the element (10) is operationally enclosed within the housing (21) to provide a leak-proof seal during operation and is self-energizing during operation such that as the differential pressure increases, it more forcefully engages the sealing surface.

32 Claims, 4 Drawing Sheets

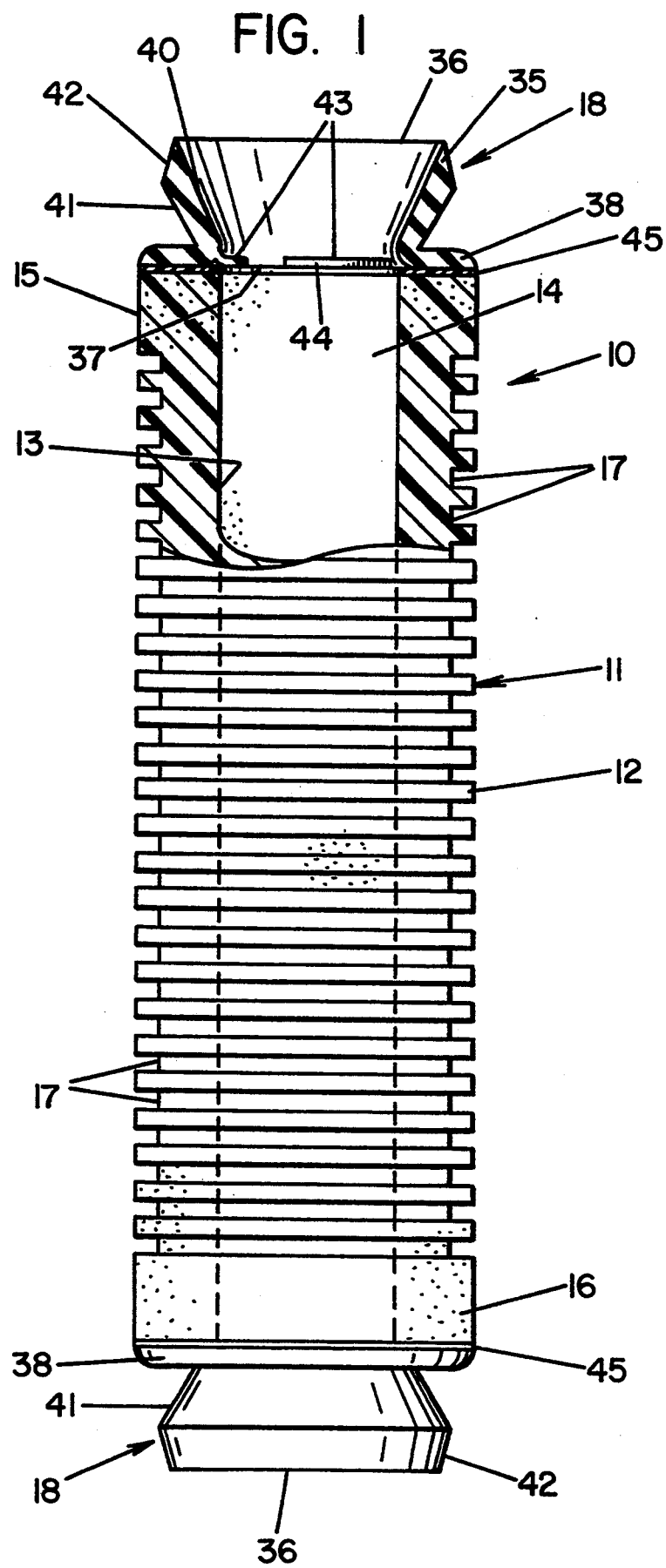

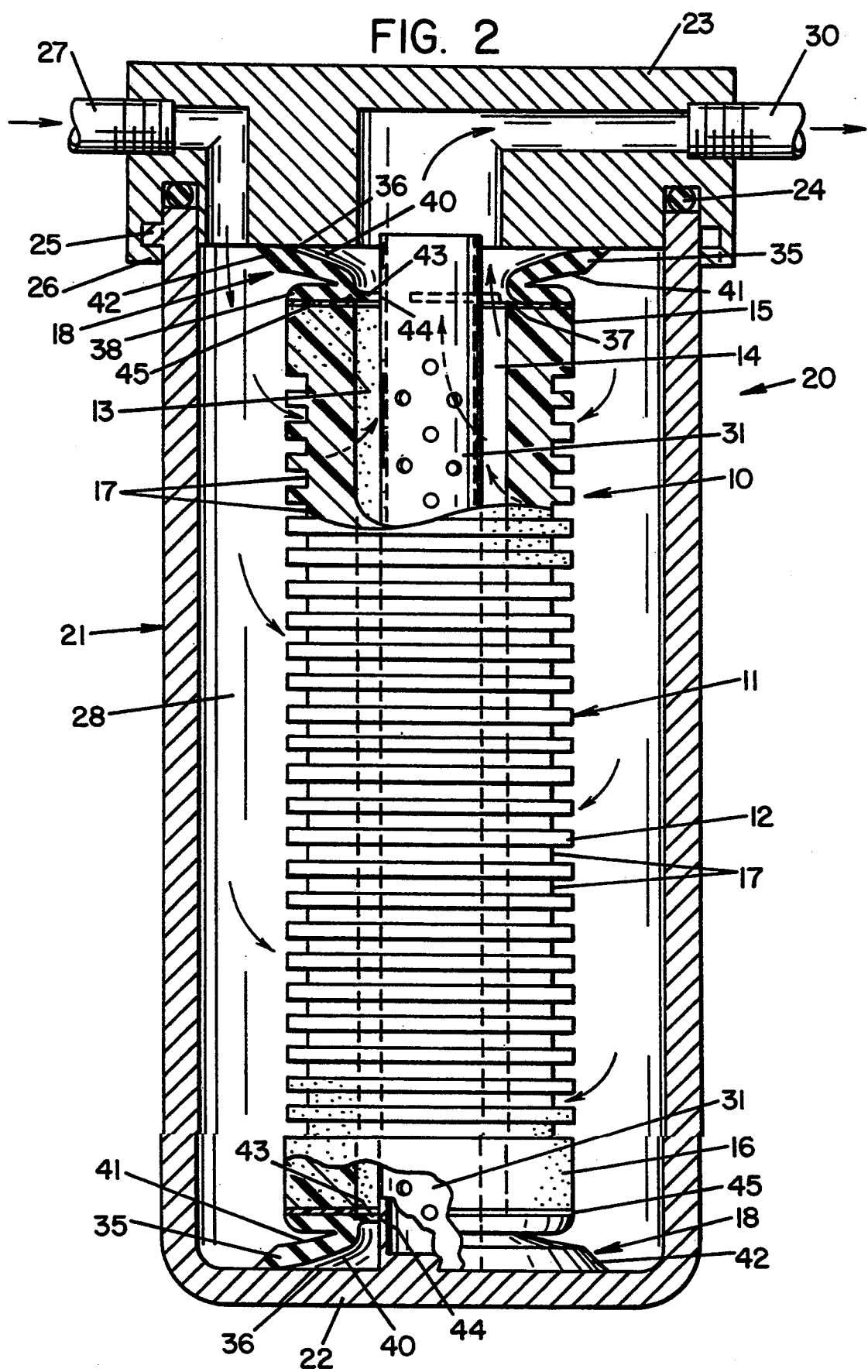

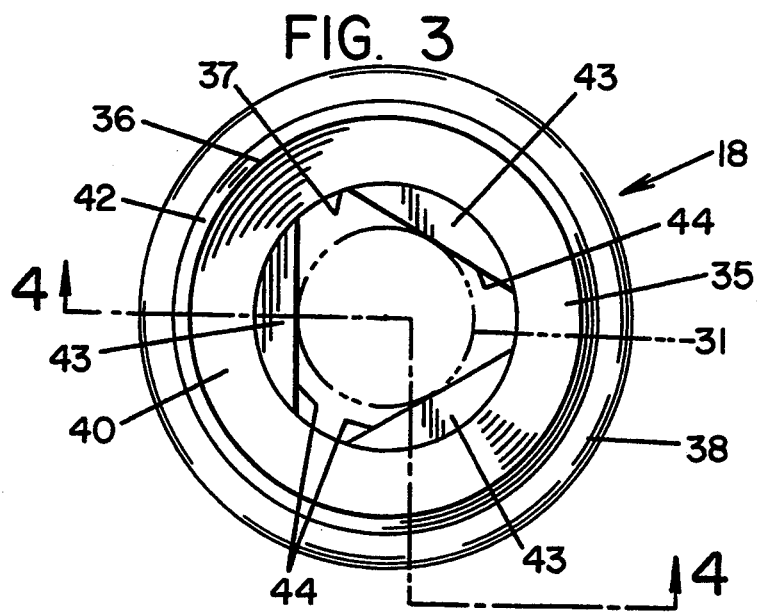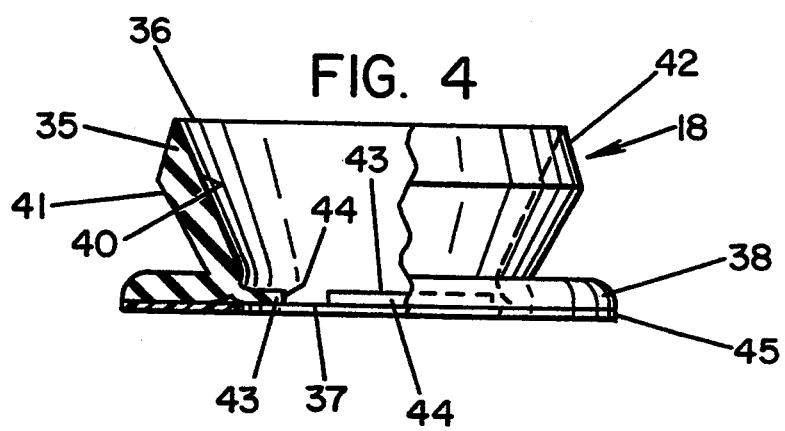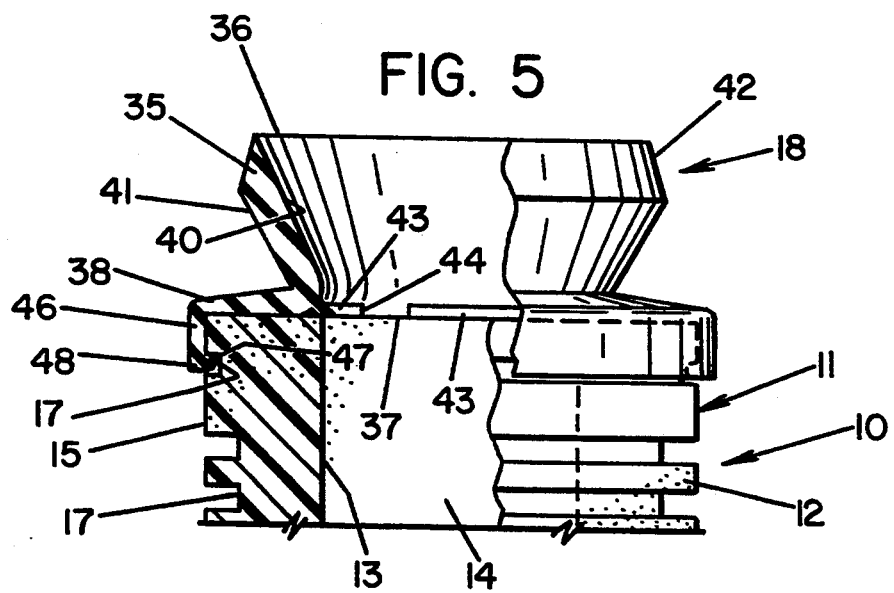

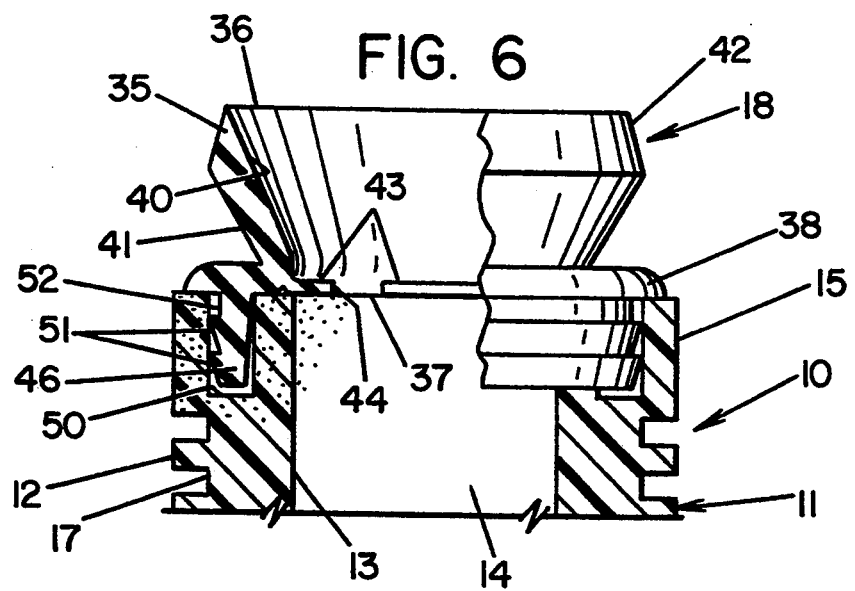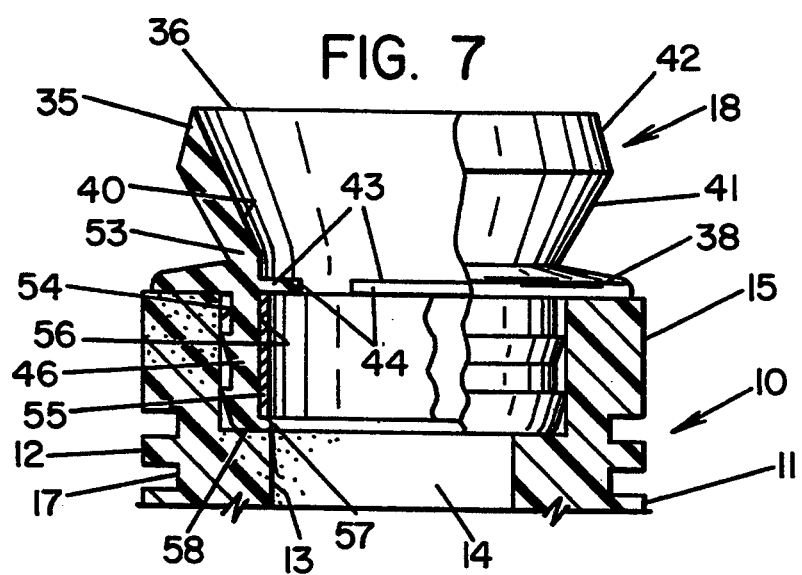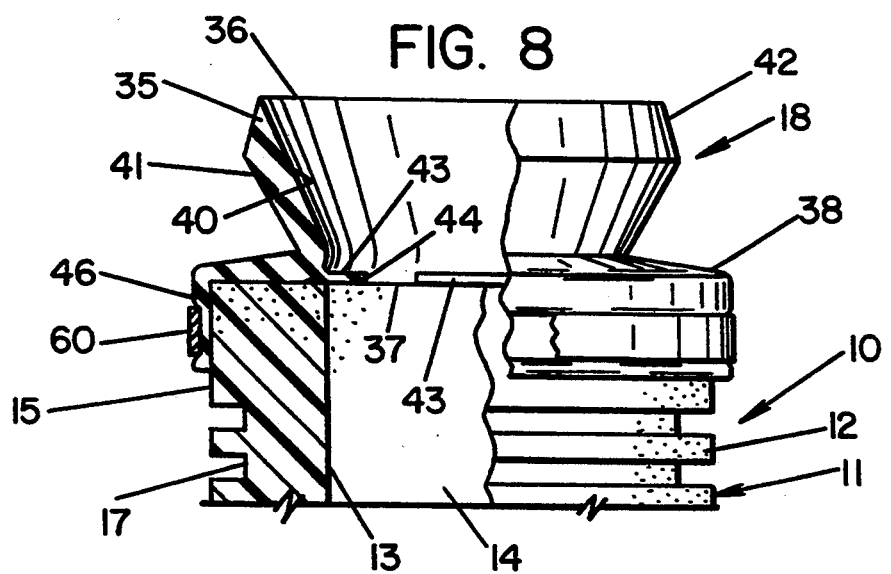

COMPRESSIBLE DIFFERENTIAL PRESSURE ENERGIZED SEALS FOR FILTER ELEMENTS AND THE LIKE

TECHNICAL FIELD

This invention relates generally to seals for filter elements and the like. More particularly, in a filtration environment, this invention relates to a seal interposed and coacting between at least one end of a filter element and a housing. Specifically, the present invention relates to a generally resilient, compressible differential pressure energized seal operatively attached to at least one end of a filter element which comprises a compressible portion extending from an annular flange.

BACKGROUND OF THE INVENTION

Filter elements are generally well known in the art and commonly used for filtering liquids and gases. There are several different types of filter elements currently available in the market, each advantageous in one respect or another, depending on the type of filtration for which it is to be used. For example, one well known type of filter element includes hollow, generally tubular, self-supporting resin impregnated and bonded fiber structures. Preferred embodiments of such filters are described in Anderson U.S. Pat. Nos. 2,539,767 and 2,539,768 and are produced and sold by the Assignee herein under the trademark MICRO-KLEAN (Cuno, Incorporated, Meriden, Conn.) wherein the bonding system is a thermosetting resin. Broadly, these filter elements are relatively rigid, self-supporting, thick-walled, tubular members composed entirely of a resin impregnated and bonded fibrous material.

Another type of filter element is also a hollow, tubular, self-supporting structure as mentioned above but an all thermoplastic polymeric bonded fiber structure. Preferred embodiments of such filters are described in Nakajima et al. U.S. Pat. Nos. 4,100,009 and 4,197,156, and are produced and sold by the Assignee herein under the Trademark Betapure.

Another type of filter element is a pleated or convoluted type filter element. Embodiments of these filters are more fully described in Landree U.S. Pat. No. 3,720,323 and Brownell U.S. Pat. No. 4,464,263. These filter elements may also be self-supporting, although they can also be used with supporting members. The disclosure will be specifically directed toward the resin impregnated and bonded fiber type filter elements. However, it will be understood that any type filter element may be substituted therefor. In any event, whatever type of filter element is employed, it is generally used for filtering liquids and gases by flowing radially inwardly under a differential pressure.

Typically, these filter elements have been adapted to be sealingly clamped in a filter housing. In the past, a sealing surface of the filter housing was required to engage the end of the filter cartridge element in order to provide a seal and to prevent by-pass of the contaminants being filtered from the fluid. Typically, the sealing surface was a circular sealing lip or knife edge protruding from the housing which engaged the end of the filter element and was concentric with the axis of the filter. A sealing surface engaged each end of the filter cartridge element. The sealing surface was embedded into the end of the fibrous structure to provide a seal between the edge and the filter element. A compression spring means or clamping means was then used to provide sufficient force to embed the sealing surface of the housing into the end of the filter cartridge element.

Alternately, there are filter housing and cartridge designs, which do not use either a sealing edge or an independent spring or clamping means to provide for the seal between the filter housing and cartridge. These designs feature filter cartridges which have a spring and seal integrally built into the cartridge construction and seal against flat, smooth surfaces in the filter housing. Upon installation, the filter cartridge is compressed between the cover and base of the filter housing and the integral spring combined with the filter media provides the initial sealing force at the end seals of the filter cartridge. However, differential pressure acts directly against this cartridge sealing force which effectively reduces the sealing force and eventually allows bypass to occur. Examples of this type of filter cartridge construction are the Peco Filter-Tex TM cartridge and the Pall Profile PRS series filters.

Attempts have been made to solve this problem, some more successfully than others. For example, the Assignee of the present invention has developed a gasket having a melt surface which abuts the filter element. The opposite surface coacts with the sealing surfaces of the housing to provide the necessary seal. Such a gasket and method for its manufacture are the subjects of U.S. Pat. Nos. 5,015,316 and 5,028,327 to Ostreicher et al.

Another problem associated with these types of filter cartridge elements is that it is often difficult to seal effectively. Various means are known for sealing the ends of filters, but most, if not all, of these means cannot be readily used with the preferred type of filter element described herein and/or are expensive and inefficient in use. For instance, Cox et al. U.S. Pat. No. 2,726,184 describes a method for improving the end seals of a pleated or convoluted type filter element. The method includes depositing an amount of unpolymerized, thermosetting adhesive in liquid form on the surface of end discs, allowing the deposited adhesive to harden, and then press fitting the end discs onto the end of the filter element. The adhesive may be in the form of a precut solid adhesive ring which may be placed in the disc. This method is complicated and expensive and requires preformed end discs to be sealed to the end of the filter element.

Another example is Kasten et al. U.S. Pat. No. 2,771,156, which describes a pleated filter element and resilient plastic end caps, the pleated filter element being embedded therein. In a process of molding the end cap, the ends of the pleated element are immersed in a mold filled with a plastic composition and cured. When the filter element is removed from the mold, the ends of the pleats are covered with a tough rubber-like product, i.e., "plastisol"—a vinyl resin with fillers, pigments, plasticizers and/or stabilizers.

In addition, Gershenson et al. U.S. Pat. No. 5,075,004 discloses a filter apparatus having a filter bag with a sealing gasket made out of a thermoplastic elastomeric material. The gasket is formed such that, as the cover plate of the apparatus is closed, the top lip portion of the gasket deflects to form a seal against the cover plate. Notably, however, such a seal is sewn onto a filter bag and not attached to a filter element. Moreover, it is clear that the inwardly directed top portion would not have the desired sealing effect on the conventional filter elements described hereinabove, which require the fluid to flow radially inwardly.

Notwithstanding these sealing methods, it is clear that the art has not provided a facile means or device by which to seal the filter element to the housing without the need for some sort of spring or clamping means and/or the sealing surface. Clearly, in Kasten et al. as well as Ostreicher et al., some sort of clamping device is employed to keep the sealing surface of the housing in contact with the various gasket-like means disposed at the ends of the filter element.

Accordingly, there is a well defined industrial need for a seal which will eliminate the need for the housing to have a sealing surface and which will adequately replace the conventional spring and clamping assemblies employed with most filtration apparatus.

SUMMARY OF INVENTION

It is therefore, an object of the present invention to provide an improved seal for filter elements and the like.

It is another object of the present invention to provide a seal, as above, which is attached to at least one or both ends of a filter element and coacts with a housing.

It is yet another object of the present invention to provide a seal, as above, which operatively engages the housing and eliminates the need for a sealing surface on the housing.

It is still another object of the present invention to provide a seal, as above, which generally replaces conventional means of clamping or sealing the filter element to the housing.

It is still a further object of the present invention to provide a filter element having an improved seal disposed on at least one end thereof.

At least one or more of the foregoing objects, together with the advantages thereof over the known art relating to filter elements and seals therefor, which shall become apparent from the specification which follows, are accomplished by the invention as hereinafter described and claimed.

In general the present invention provides a compressible differential pressure energized seal coacting between a filter element and the like and a housing, the seal comprising a compressible portion having a large open end and a small open end, the large end directed toward and contacting the housing and the small end directed toward the filter element; and an annular flange integrally attached to the compressible portion at its small end and extending outwardly, the flange operatively communicating with the filter element.

The present invention also includes, in combination with a filter element or the like having an inner circumferential area defining a hollow core, an outer surface area, and opposed ends, a compressible differential pressure energized seal operatively disposed upon at least one of the ends of the filter element comprising a compressible portion having a large open end and a small open end; and an annular flange integrally attached to the compressible portion at its small end and extending radially outwardly, the flange operatively communicating with the end of the filter element upon which the seal is disposed.

BRIEF DESCRIPTION OF THE DRAWINGS

FIG. 1 is a side elevational view, partially in longitudinal section, of a filter element having a sealing article of the present invention operatively disposed on each end of the filter element;

FIG. 2 is a longitudinal sectional view of a filtration apparatus having the filter element of FIG. 1 operatively positioned therein;

FIG. 3 is an enlarged top plan view of the filter element of FIG. 1;

FIG. 4 is a sectional view of the filter element of FIG. 1 taken substantially along line 4—4 in FIG. 3;

FIG. 5 is a side elevational view partially in section of an alternative embodiment of the sealing article of the present invention as disposed upon one end of the filter element;

FIG. 6 is a side elevational view partially in section of another embodiment of the sealing article;

FIG. 7 is a side elevational view partially in section of yet another embodiment of the sealing article of the present invention; and FIG. 8 is a side elevational view partially in section of still another embodiment of the sealing article of the present invention.

PREFERRED EMBODIMENT FOR CARRYING OUT THE INVENTION

As discussed hereinabove, apart from the novelty of the filter elements as taught by the present invention, filter elements used in this invention are generally well known in the art. As previously indicated, these elements may be produced, for example, as described in Assignee's U.S. Pat. Nos. 2,539,767 and 2,539,768 to Anderson, the entire disclosures of which are incorporated herein by reference. In the current MICROKLEAN production process, the Anderson process has been modified so that the fibers are vacuum accreted from a uniform aqueous dispersion and then, subsequently, vacuum impregnated with a water soluble thermosetting resin. Accordingly, the filter elements to which the present invention pertain preferably generally comprise a relatively rigid, self-supporting, porous, thick-walled tubular member composed entirely of resin-impregnated and bonded fibrous materials.

However, it will be appreciated that, inasmuch as the present invention relates to an improved means for sealing the filter element to the housing, any type filter element may be substituted for the preferred filter elements without departing from the scope or spirit of the invention. For convenience, the resin impregnated and bonded fiber type filter elements are illustrated and exemplified herein. However, it will be understood that other conventional filter elements may be used and that the present invention is not necessarily limited thereto.

With reference to the drawings, the filter element of the present invention is depicted in FIG. 1 and is indicated generally by the numeral 10. The filter element 10 preferably comprises a cylindrical structure or body 11 having an outer surface 12, inner circumferential surface 13 defining a hollow axial core 14, and opposed ends 15 and 16. The outer surface 12 may include grooves 17 to provide increased surface area and contaminant capacity. At each end 15 and 16 of the element 10 is a generally resilient, compressible differential pressure energized seal generally indicated by the numeral 18 and used to seal the element 10 within a housing as more particularly discussed hereinbelow.

The filter element 10 is typically part of a filtration apparatus indicated generally by the numeral 20 in FIG. 2. As shown, the apparatus 20 generally includes a housing, generally indicated by the numeral 21, and the element 10 operatively positioned within the housing 21. The housing 21 typically includes a container-like base 22 and a cover 23 securably attached to the base 22 by any means known in the art such as by complementary lips 25 and 26 on base 22 and cover 23, respectively with an O-ring 24 therebetween. An inlet port 27 is shown in filtration apparatus 20, and more particularly, in cover 23 for providing an inlet for the fluid to be filtered into a chamber 28 defined between the housing 21 and the element 10. Similarly, a second port 30 is shown as communicating between the hollow axial core 14 and the external environment through the cover 23 in order to provide the fluid which has been filtered with an outlet. Accordingly, it should be clear that filter element 10 is intended to be used for filtering liquids and gases which are usually caused to flow radially inwardly under a differential pressure (see FIG. 2).

With further reference to FIG. 2, the housing 21 typically also includes a foraminous, hollow centering rod 31 securably attached to the bottom of the base 22. Rod 31 is generally positioned radially concentrically within base 22 such that the filter element 10 can be placed thereover, the hollow axial core 14 of the element 10 receiving the rod 31.

In use, it will be appreciated that fluids such as liquids and gases usually enter the filtration apparatus 20 through port 27 and are received in chamber 28. The fluid then passes through the wall of the filter element 10 or cartridge and is collected in the axial core 14 of the element 10. The filtered fluid may then pass through the outlet port 30 to the point of use.

Typically, the compressible differential pressure energized seal 18 of the present invention should be capable of withstanding the operating pressures and temperatures required of the filter element 10 in its intended use and thus, no particular operating range has been specified herein.

The filter element 10 may be used in varying lengths or multiples of a single length, stacked one on top of another. In such an arrangement, all of the elements in multiple height stack arrangements are preferably fastened together by a bonding agent, e.g., polypropylene, to assure alignment and permanent bonding for positive sealing against by-pass of fluids.

The basic novel component of the filtration apparatus 20, and more specifically, the filter element 10 of the present invention is the generally resilient, compressible differential pressure energized seal 18 positioned at the ends 15 and 16 of the filter element 10. The seal 18 is preferably made from a thermoset rubber or a thermoplastic elastomer, depending on the operating conditions, e.g., temperature, type of fluid, etc., of the apparatus 20. An example of thermoset rubbers suitable for use in making the seal 18 are ethylene-propylene terpolymers (EPDM). An example of a thermoplastic elastomer suitable for the present invention is Santoprene, a polymer alloy of polyproplyene and EPDM available from and a trademark of Monsanto Company.

The seal 18 generally comprises a compressible portion 35 generally having a large open end 36 and a small open end 37 and an annular flange 38 integrally attached to the compressible portion 35 at the small end 37 thereof. As shown in FIGS. 1 and 4, the compressible portion 35 of the seal 18 is preferably generally frustoconical in shape and includes a generally smooth radially inwardly slanted inner surface 40 and an outer surface 41 which is similarly slanted proximate to its small end 37 but which is tapered so as to present a beveled surface 42 near its large end such that beveled surface 42 communicates between the inner surface 40 and the outer surface 41 of seal 18. As depicted in FIG. 1, the annular flange 38 extends generally radially outwardly and operatively communicates with one or both ends 15, 16 of the filter element 10.

Furthermore, as more particularly shown in FIG. 3, the seal 18 may also comprise at least one, and preferably three flaps 43 integrally formed with and extending inwardly from the interface between the compressible portion 35 and the flange 38. The flaps 43 generally lie parallel to the flange 38. Functionally, the flaps 43 are used to align the filter element 10 on the centering rod 31 when the element 10 is placed thereover. For example, as shown in FIG. 3, the edges 44 of the flaps 43 tangentially contact the centering rod 31. Based upon this contact, the filter element 10 can be properly positioned over rod 31 in housing 21.

In the drawings, centering rod 31 is shown as generally cylindrical. However, triangular rods are also common and therefore, it will be appreciated that the seal 18 with flaps 43 can accommodate such a triangular rod and center the filter element placed in a housing containing such a rod. Moreover, the invention should not necessarily be limited to three flaps positioned as shown in the drawings. Accordingly, a rectangular or other conventional rod may also be used with the present invention, the number and position of the flaps 43 being adjusted for use therewith.

There are various means by which the compressible differential pressure energized seal 18 can be operatively attached to the filter element 10. More particularly, depending upon the compatibility between the seal 18 and filter element 10, as well as the intended use of the filter, the seal may be affixed, or operatively associated with the latter in at least three different manners, i.e., mechanically attached; affixed with an appropriate adhesive; or, thermally bonded thereto. If the compressible differential pressure energized seal 18 is a thermoset rubber material, it can be operatively attached to the filter element 10 by adhesive means or mechanical means. Adhesive means shall include any means known in the art. In addition to those attachment methods mentioned previously, a thermoplastic elastomer material can be bonded to the filter element 10 by any means known in the art and preferably, by thermal bonding. Sometimes an intermediate compatible thermoplastic disc 45 which is bondable to the filter element 10 is required for the thermal bonding. FIGS. 1 and 4 generally show the preferred embodiment of the seal 18. The preferred embodiment using a Santoprene elastomer seal with a phenolic resin bonded Micro Klean filter element requires the use of an intermediate polypropylene disc which can be thermally bonded to the filter element either before or after being operatively attached to the seal. The disc can be thermally bonded or mechanically affixed to the seal.

Now, referring to FIGS. 5–8, the seal 18 may further include a skirt 46 which is integrally connected to the flange 38 and which extends further within the housing 21 so as to operatively engage the filter element 10. As can be seen in the various embodiments shown in FIGS. 5–8, the skirt 46 can extend from any of several junctures on flange 38.

Specifically, for the embodiment depicted in FIG. 5, the skirt 46 extends from the outer periphery of the flange 38 tightly around one end of the filter element 10. The skirt 46 preferably includes at least one inwardly directed flange 47 at the distal end 48 of the skirt 46 which is received by at least one of the grooves 17 in the filter element 10. Accordingly, the seal 18 is attached to the element 10 by the skirt 46 sealingly engaging the element 10, instead of via an adhesive.

In FIG. 6, another embodiment of the seal 18 is depicted wherein the filter element 10 includes an annular recess 50 in the end 15 or 16 thereof. The recess 50 receives the skirt 46 which, in this embodiment, extends generally from the mid-region of the flange 38. At least one annular barb 51 may ring skirt 46, preferably on the outer surface 52 thereof so as to prevent the seal from disengaging the recess 50. In operation, the barbs 51 are slidably received within recess 50 as part of skirt 46. However, because of their angle and cut, the barbs 51 provide a rather through seal and are not easily disengaged from recess 50.

With reference to FIG. 7, yet another embodiment of the seal 18 is shown wherein the skirt 46 extends from the interface 53 of the compressible portion 35 and the flange 38. Here, the skirt 46 generally engages a counterbore 54 in the inner circumferential surface 13 of the filter element 10. While the skirt 46 may also include at least one barb 51 as detailed hereinabove, it will be appreciated that in order to secure the seal 18 to the filter element 10, an independent means for retaining the seal 18 to the element 10, such as compressible band 55, can be employed. Where band 55 is used, it is preferably positioned so as to forcefully contact the inside surface 56 of skirt 46 under flaps 43 upon expansion. A lip 57 may extend inwardly from the distal end 58 of skirt 46 and act in conjunction with flaps 43 to sealingly position the band 55 therebetween. Accordingly, the seal 18 is secured to the filter element 10 at skirt 46 which is secured between the retaining band 55 and the inner circumferential surface 13 of the filter element 10.

With reference to FIG. 8, the skirt 46 again extends from the outer periphery of the flange 38 and fits tightly around the filter element 10, similar to FIG. 5. However, in FIG. 8, the skirt 46 is secured to the filter element 10 at its outer surface 12 by a different retaining band 60 from that in FIG. 7. The band 60 forcefully engages the skirt 46 around the filter element 10 such that the skirt 46 is clamped between retaining band 60 and the outer surface 12 of the filter element 10.

Returning to FIG. 2, it will be appreciated that the compressible portion 35 of the seal 18 provides a necessary seal so as to eliminate the need for any additional clamping or sealing means as conventionally known in the art. Notably, the compressible portion 35 having its large end 36 directed toward and contacting the housing 21 and its small end 37 directed toward the filter element 10 is capable of sealing against a flat surface, as presented by base 22 and cover 23 in FIG. 2. The sealing surface is not required to align itself with the upper rim of the seal 18 as defined by the large open end 36. In fact, the seal 18 can readily compensate for generally non-aligned angles or surface which are not "square" with the large open end 36. Moreover, the seal 18 is capable of sealing under minimal or maximum deformation. Thus, while the seal 18 is preferably capable of compressing or deforming about one-half inch, it does not have to compress fully in order to create a suffice seal.

Importantly, the stiffness and compression force characteristics of the seal 18 are generally controlled by the hardness or durometer of the material, the thickness of the compressible portion 35, and the angle at which the compressible portion 35 is slanted. Moreover, while it is the deformation of the compressible portion 35 which provides the necessary initial sealing force, the seal 18 is also differential pressure energized. That is, once the seal 18 is seated against the cover 23 as shown in FIG. 2, the differential pressure that develops across the filter element will increase the sealing load thus, maintaining an adequate seal. More importantly, as the differential pressure increases in the filtration apparatus 20, the seal 18 becomes more securely engaged to and sealed against the cover 23.

In operation, the filter element 10 can be placed in housing 21 by sliding it over centering rod 31. Notably, filter element 10 may employ the seal 18 at only one end. However, when this is the case, it is highly recommended that the other end of the element have some other suitable means for sealing in order to promote the operation of the device. As shown in FIG. 2, seals 18 are on both ends of the element 10 and when cover 23 is secured onto base 22, both seals 18 can compress and sealingly engage the element 10 within housing 21. As can be seen in FIG. 2, the seals 18 generally compress by folding or deforming at the interface of the compressible portion 35 and the flange 38. Accordingly, the large end 36 of the compressible portion 35 is forced closer to the small end 37 and increases in diameter. This creates the required seal.

Thus it should be evident that the device and method of the present invention are highly effective in sealing the filter element 10 within the housing 21. The invention is particularly suited for use in filtration apparatus, but is not necessarily limited thereto. The device and method of the present invention can be used separately with other equipment and the like for sealing parts together.

Furthermore, it will be appreciated that a filter element 10 which employs the seal 18 is generally self-centering on the centering rod 31 due to the flaps 43 of seal 18. It will also be appreciated that no springs or clamps are required to hold the seal in place between the housing 21 and the element 10.

Based upon the foregoing disclosure, it should now be apparent that the use of the apparatus and/or seal described herein will carry out the objects set forth hereinabove. It is, therefore, to be understood that any variations evident fall within the scope of the claimed invention and thus, the selection of specific components for the apparatus 20 and filter element 10 can be determined without departing from the spirit of the invention herein disclosed and described. In particular, as previously stated, the filter element depicted for the present invention is not necessarily limited to resin impregnated and bonded fiber type filter elements. Moreover, other means for retaining the seal 18 on element 10 can be substituted for the bands disclosed in FIGS. 7 and 8 or for the skirt 46 as noted hereinabove. Thus, the scope of the invention shall include all modifications and variations that may fall within the scope of the attached claims.

What is claimed is:

1. In combination with a generally porous, tubular filter element means having an inner circumferential area defining a hollow core for the passage of filtered fluids, an outer surface area, and opposed ends, an elastomeric differential pressure energized seal operatively disposed upon at least one of the ends of said filter element means, said seal comprising:

a compressible portion having a large open end and a small open end, said large end directed toward and contacting the housing and said small end directed toward the filter element means and communicable with the core, neither said small nor said large ends interfering with the passage of filtered fluids through the core; and an annular flange integrally attached to said compressible portion at its said small end and extending radially outwardly, said flange operatively communicating with the end of said filter element means upon which said seal is disposed.

2. The combination, as set forth in claim 1, wherein said flange mechanically engages said filter element means.

3. The combination, as set forth in claim 2, wherein the seal further comprises a skirt integrally connected to said flange which operatively engages said filter element means.

4. The combination, as set forth in claim 3, further including independent means for retaining the seal to said filter element means.

5. The combination, as set forth in claim 4, wherein said skirt extends from the interface of said compressible portion and said flange and contacts said filter element means at its inner circumferential area, said means for retaining forcefully engaging said skirt within said filter element means such that said skirt is secured between said means for retaining and the inner circumferential area of said filter element means.

6. The combination, as set forth in claim 4, wherein said skirt extends from the outer periphery of said flange and contacts said filter element means at its outer surface area, said means for retaining forcefully engaging said skirt around said filter element means such that said skirt is secured between said means for retaining and the outer surface area of said filter element means.

7. The combination, as set forth in claim 3, wherein said filter element means includes a plurality of circumferential grooves and said skirt extends from the outer periphery of said flange around the end of said filter element means and includes at least one inwardly directed flange at its distal end which can be received by one of said grooves in said filter element means.

8. The combination, as set forth in claim 3, wherein said filter element means includes recess means for receiving said skirt, said skirt extending from said flange and having barb means to prevent disengagement of said seal from said recess means.

9. The combination, as set forth in claim 1, wherein the seal further comprises flap means for aligning the seal with said filter element means, said flap means being integral with and extending inwardly from the interface between said compressible portion and said flange.

10. The combination, as set forth in claim 9, further in combination with a housing having rod means for centrally positioning and operatively communicating with said filter element means.

11. The combination, as set forth in claim 10, wherein said flap means includes at least one flap which contacts said rod means so as to properly align said filter element means in the housing.

12. The combination, as set forth in claim 1, wherein the seal is made from a thermoplastic elastomer.

13. The combination, as set forth in claim 12, wherein said flange is operatively attached to a disc which is thermally bonded to said filter element means.

14. The combination, as set forth in claim 13, wherein said disc is made from a thermoplastic.

15. The combination, as set forth in claim 1, wherein said flange is attached to said filter element means by an adhesive.

16. The combination, as set forth in claim 1, wherein said flange is thermally bonded to said filter element means.

17. The combination, as set forth in claim 1, wherein the seal is made from a thermoset rubber.

18. An elastomeric differential pressure energized seal coacting between filter element means, having at least one circumferential groove, and a housing, said seal comprising:

a compressible portion having a large open end and a small open end, said large end directed toward and contacting the housing and said small end directed toward the filter element means;

an annular flange integrally attached to said compressible portion at its said small end and extending outwardly, said flange operatively communicating with the filter element means and mechanically engageable therewith; and a skirt integrally connected to said flange and operatively engaging the filter element means, said skirt extending from the outer periphery of said flange around one end of the filter element means and including at least one inwardly directed flange at its distal end which is received by one of said grooves in the filter element means.

19. An elastomeric differential pressure energized seal, as set forth in claim 1, wherein said seal is made from a thermoset rubber.

20. An elastomeric differential pressure energized seal, as set forth in claim 1, wherein said seal is made from a thermoplastic elastomer.

21. An elastomeric differential pressure energized seal coacting between filter element means having recess means and a housing, said seal comprising:

a compressible portion having a large open end and a small open end, said large end directed toward and contacting the housing and said small end directed toward the filter element means and mechanically engageable therewith;

an annular flange integrally attached to said compressible portion at its said small end and extending outwardly, said flange operatively communicating with the filter element means; and a skirt integrally connected to said flange operatively engageable with said recess means of the filter element means, said skirt extending from said flange and having barb means to prevent disengagement of said seal from said recess means.

22. An elastomeric differential pressure energized seal, as set forth in claim 21, further including independent means for retaining the seal to the filter element means.

23. An elastomeric differential pressure energized seal, as set forth in claim 22, wherein the filter element means has an inner circumferential area and said skirt extends from the interface of said compressible portion and said flange and contacts the filter element means at its inner circumferential area, said means for retaining forcefully engaging said skirt within the filter element means such that said skirt is secured between said means for retaining and said inner circumferential area of the filter element means.

24. An elastomeric differential pressure energized seal, as set forth in claim 22, wherein the filter element means has an outer surface area and said skirt extends from the outer periphery of said flange and contacts the filter element means at its outer surface area, said means for retaining forcefully engaging said skirt around the filter element means such that said skirt is secured between said means for retaining and said outer surface area of the filter element means.

25. An elastomeric differential pressure energized seal, as set forth in claim 21, wherein the seal is made from a thermoset rubber.

26. An elastomeric differential pressure energized seal, as set forth in claim 21, wherein the seal is made from a thermoplastic elastomer.

27. An elastomeric differential pressure energized seal coacting between filter element means and a housing, said seal comprising:
   a compressible portion having a large open end and a small open end, said large end directed toward and contacting the housing and said small end directed toward the filter element means;
   an annular flange integrally attached to said compressible portion at its said small end and extending outwardly, said flange operatively communicating with the filter element means; and
   flap means for aligning the filter element means with the housing, said flap means being integral with and extending inwardly from the interface between said compressible portion and said flange.

28. An elastomeric differential pressure energized seal, as set forth in claim 27, wherein the housing includes a centering rod axially positioned therein and wherein said flap means includes at least one flap which contacts said centering rod so as to properly align the filter element means in the housing.

29. An elastomeric differential pressure energized seal, as set forth in claim 27, wherein the seal is made from a thermoset rubber.

30. An elastomeric differential pressure energized seal, as set forth in claim 27, wherein the seal is made from a thermoplastic elastomer.

31. An elastomeric differential pressure energized seal, as set forth in claim 30, wherein said flange is operatively attached to a disc which is thermally bonded to the filter element means.

32. An elastomeric differential pressure energized seal, as set forth in claim 31, wherein said disc is made from a thermoplastic.

* * * * *